United States Patent Office 2,733,041
Patented Jan. 31, 1956

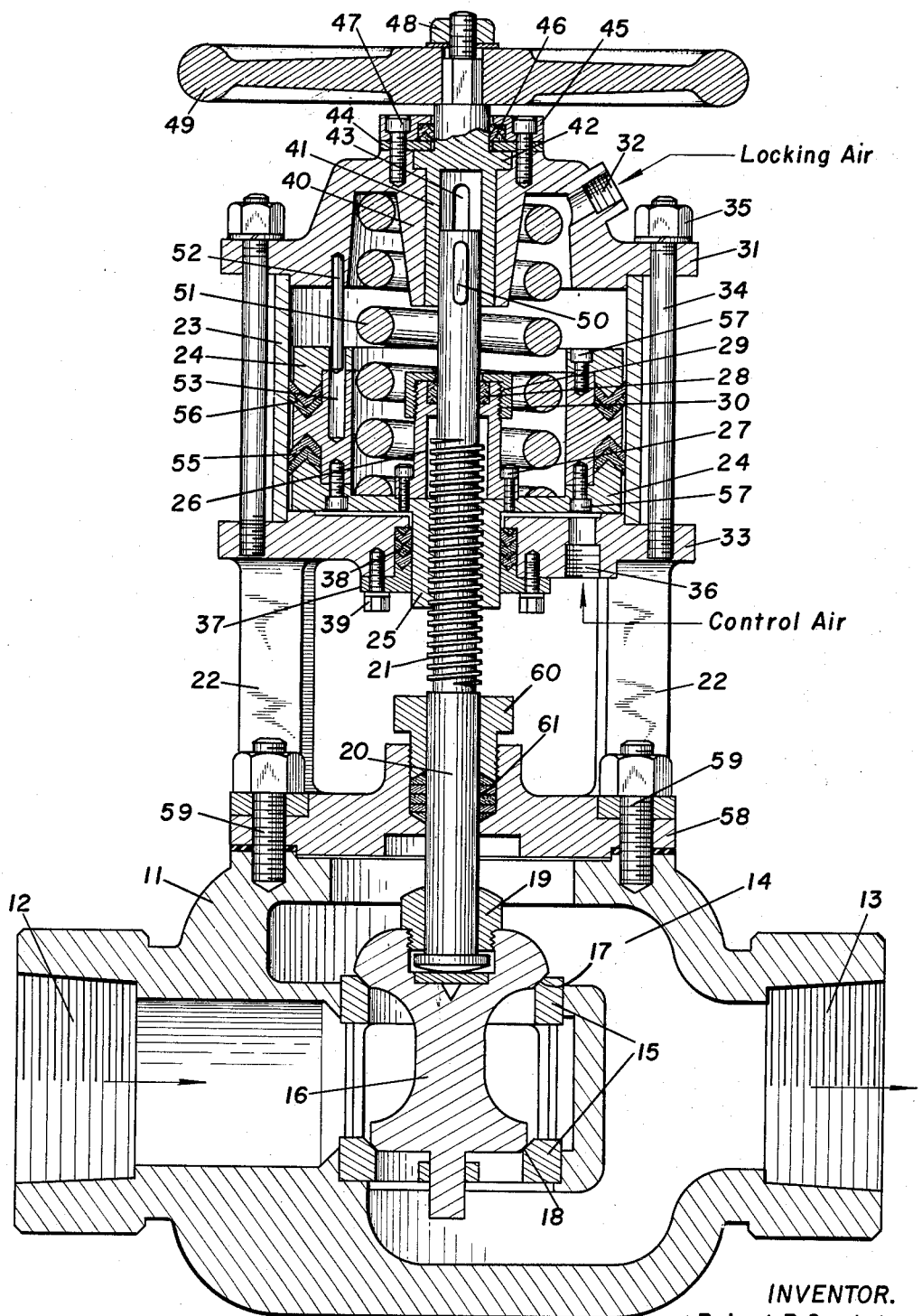

2,733,041
STEAM VALVE

Robert R. Crookston, Houston, Tex., assignor, by mesne assignments, to Esso Research and Engineering Company, a corporation of Delaware Application September 4, 1952, Serial No. 307,893

4 Claims. (Cl. 251—14)

The present invention is directed to a steam valve. More particularly, the invention is directed to a steam valve which may be manually and remotely controlled. In its more specific aspects, the invention is directed to a steam valve which may be opened and closed by pressure or manually.

The device of the present invention may be described briefly as involving a steam valve which comprises, in combination, a valve housing having an inlet and an outlet and provided with a central passageway communicating the inlet with the outlet. The valve housing has a seating member arranged in the central passageway and attached to the valve housing is a piston cylinder provided with first and second inlets at an upper and lower end of the piston cylinder. A piston is arranged in the piston cylinder which has an internally threaded member projecting downwardly from the piston cylinder in sliding relationship thereto. The valve housing has a valve plug arranged in it adapted to seat on the seating member. There is attached to the valve plug a valve stem provided with a threaded intermediate portion engaging with the threads of the projecting member for raising and lowering the valve plug from and to seating relationship with the seating member. The valve stem extends into the piston cylinder and projects into the upper end thereof. Surrounding the valve stem and bearing against the piston in the piston cylinder is a biasing means, such as a coil spring, which normally urges the piston toward the lower end of the piston cylinder. In the upper end of the piston cylinder is a sleeve member projecting downwardly. A valve actuating assembly is rotatably arranged in the sleeve member and is slidably attached to an upper end of the valve stem and projects outwardly from the piston cylinder. Means are attached to the actuating assembly exterior to the piston cylinder for rotating the valve stem and lifting and lowering the valve plug from and to the seating member independent of movement of the piston.

The invention will be further described by reference to the drawing in which the single figure is a sectional view of a preferred embodiment.

Referring now to the drawing, numeral 11 designates a valve housing provided with an inlet 12 and an outlet 13. Communicating the inlet 12 and the outlet 13 is a central passageway 14 which allows passage from the inlet to the outlet. The valve housing is provided in the central passageway with seating members 15 on which there is adapted to seat in sealing relationship a valve plug 16 which is a double plug in a dumb-bell shape provided with seating surfaces 17 and 18. The valve plug 16 is attached by attaching means 19 to a valve stem 20 which has a threaded intermediate portion 21.

Attached to the housing 11 by supporting members 22 is a piston cylinder 23 in which is arranged a piston 24.

The threaded intermediate portion of the valve stem 20 is threadably engaged with a downwardly projecting inwardly threaded member 25 which is an extension of piston member 24 and which is slidably arranged in the piston cylinder 23. The threaded valve stem 20 passes through a stuffing box 26 which is attached by cap screws 27 to the piston 24. The stuffing box 26 is provided with packing, such as chevron packing 28, and an internally threaded cap 29 which engages with mating threads 30 of the stuffing box 26.

The upper end of the piston cylinder 23 is closed with a cap 31 which defines a threaded inlet 32 for connection to a suitable pipe or conduit. The cap 31 is connected to a base member 33 of the cylinder 23 by threaded bolts 34 provided with lock nuts 35. The base member 33 defines a second threaded inlet 36 which is adapted to be connected to a pipe or conduit, not shown.

The downwardly projecting member 25 of the piston 24 is sealed by a sealing member 37 which forces packing 38 into engagement with the member 25 and the base member 33. Threaded nuts 39 hold the member 37 and the packing 38 in sealing engagement with the member 25.

The cap 31 of piston cylinder 23 defines a downwardly projecting sleeve 40 in which is rotatably arranged a tubular valve actuating member 41 which defines with an exterior surface thereof an outwardly projecting shoulder 42 and with an interior surface a keyway 43.

The valve actuating assembly 41 is sealed in the piston cylinder 23 by a plate 44 which rests partly on the shoulder 42 and partly on the cap 31. A cap 45 holds packing 46 in sealing relationship with the valve actuating assembly 41 and the whole assembly, including the cap 45, the packing 46, and the plate 44, are held in sealing relationship by means of cap screws 47.

The valve actuating assembly is connected by means of a hex nut 48 with a valve wheel 49 for rotating the valve stem 20 as will be described.

The valve stem 20 is slidably arranged in the tubular valve actuating assembly 41 and is provided with a spline or key 50 for operation of the valve stem 20 as will be described. The spline or key 50 is arranged in keyway 43.

The piston cylinder 23 has arranged in it a helical coil spring 51 which bears with its upper end against the cap 31 and with its lower end against the piston 24. The helical coil spring 51 normally urges the piston 24 in a downward direction.

The cap 31 is provided with pins 52 which project downwardly in the piston cylinder 23 into slots 53 of the piston 24. These pins prevent rotation of the piston 24 when the valve is manually operated. The piston 24 is provided with a sleeve shaped member 54 which serves to enclose packing 55 and 56 which allows a seal to be made with the wall of the piston cylinder 23. The upper end of the piston 24 may be secured to the lower portion thereof by cap screws 57.

The valve stem 20 extends from the valve housing 11 through a plate member 58 which is secured to the housing 11 by means of threaded bolts 59. Surrounding the lower portion of the valve stem 20 is a packing gland 60 and packing 61 which provide a seal for the valve stem 20 as it passes through the plate 58.

The device of the present invention may be operated in the following manner with respect to remotely controlled operations: In instances where it is desired for remote throttling of an oil well drilling rig employing a steam engine control or "opening" air would be admitted through the inlet 36 which would serve to force the piston 24 in an upward direction overcoming the helical coil spring 51 which is normally urging the piston 24 in a downward position. The pressure of the control air would serve to lift the valve stem 20 and the seats 17 and 18 from the seating members 15 allowing steam to pass from the inlet 12 to the outlet 13. When it is desired to close the valve the control air pressure would be released and the coil spring 51 would bias the piston 24 downwardly causing the valve plug 16 to seat on the seating members 15. To insure proper seating it may be desirable to inject "locking" air by inlet 32 against the piston 24.

When it is desired to employ the valve manually for any reason, such as in an emergency such as may happen if the spring 51 should break or take a permanent set, the valve wheel 49 and the valve actuating assembly 41 may be rotated causing the valve stem 20 to be rotated by means of the spline 50 in the keyway 43. Thus the valve may be operated independently of the movement of the piston 24.

It is desirable that the spring 51 be pre-compressed a sufficient amount to overcome a slightly unbalanced effect of the steam pressure passing from inlet 12 into passageway 14 acting on the valve plug 16. It will be noted that the seating surface 18 has an area slightly smaller than seating surface 17 and, therefore, it is desirable to compensate for the unbalanced effect by precompression of spring 51.

The present invention while having application to steam operated oil well drilling rigs has application to any system using steam for control.

As an example of the operation of the valve of the present invention at a normal steam rig operating pressure the valve unbalance on the opening direction may be 400 or 500 pounds and the restraining spring, such as spring 51, should be pre-compressed by approximately that amount. It is contemplated that the valve may be opened partially at about 20 pounds per square inch gauge and completely opened at about 80 pounds per square inch gauge.

The valve of the present invention is advantageous in that the slip joint allows the piston to move the valve independently with respect to the valve box. Likewise, the valve actuating assembly, including the valve wheel 49, allows the valve to be moved independently of the spring.

The nature and objects of the present invention having been completely described and illustrated, what I wish to claim as new and useful and to secure by Letters Patent is:

1. A steam valve which comprises, in combination, a valve housing having an inlet and an outlet and provided with a central passageway communicating the inlet with the outlet, a seating member in said central passageway provided with a first and a second seating surface both facing in a first direction, a piston cylinder attached to said housing provided with first and second inlets at an upper and a lower end of said cylinder, a piston arranged in said piston cylinder having an internally threaded member projecting from said piston cylinder in sliding relationship thereto, a double valve plug provided with third and fourth seating surfaces both facing in a direction opposite the first direction adapted to seat on said first and second seating surfaces on said seating member to close said central passageway, a valve stem attached to said valve plug provided with an externally threaded intermediate portion engaging with the threads of said projecting member for raising and lowering said valve plug from and to seating relationship with said seating member, said valve stem extending into said piston cylinder and projecting into the upper end thereof, biasing means in said piston cylinder normally urging said piston toward the lower end of said cylinder, a sleeve member projecting downwardly into said piston cylinder from the upper end thereof, a valve actuating assembly rotatably arranged in said sleeve member slidably attached to an upper end of said valve stem and projecting from said cylinder, said valve actuating assembly and said valve stem being slidably attached by a key on said valve stem arranged in a keyway in said valve actuating assembly, and means attached to said actuating assembly exterior to said piston cylinder for rotating said valve stem and lifting and lowering said valve plug from and to said seating member independent of movement of said piston.

2. A steam valve which comprises, in combination, a valve housing having an inlet and an outlet and provided with a central passageway communicating the inlet with the outlet, a seating member in said central passageway provided with a first and a second seating surface both facing in a first direction, a piston cylinder attached to said housing provided with first and second inlets at an upper and a lower end of said cylinder, a piston arranged in said piston cylinder having an internally threaded member projecting from said piston cylinder in sliding relationship thereto, a double valve plug provided with third and fourth seating surfaces both facing in a direction opposite the first direction adapted to seat on said first and second seating surfaces on said seating member to close said central passageway, a valve stem attached to said valve plug provided with an externally threaded intermediate portion engaging with the threads of said projecting member for raising and lowering said valve plug from and to seating relationship with said seating member, said valve stem extending into said piston cylinder and projecting into the upper end thereof, a coil spring in said piston cylinder normally urging said piston toward the lower end of said cylinder, a sleeve member projecting downwardly into said piston cylinder from the upper end thereof, a tubular valve actuating assembly rotatably arranged in said sleeve member slidably attached to an upper end of said valve stem and projecting from said cylinder, said valve actuating assembly and said valve stem being slidably attached by a key on said valve stem arranged in a keyway in said valve actuating assembly, and a hand wheel attached to said actuating assembly exterior to said piston cylinder for rotating said valve stem and lifting and lowering said valve plug from and to said seating member independent of movement of said piston.

3. A steam valve which comprises, in combination, a valve housing having an inlet and an outlet and provided with a central passageway provided with a first and a second seating surface both facing in a first direction communicating the inlet with the outlet, a seating member in said central passageway, a piston cylinder attached to said housing provided with first and second inlets at an upper and a lower end of said cylinder and having at least a downwardly projecting pin, a piston arranged in said piston cylinder having an internally threaded member projecting from said piston cylinder in sliding relationship thereto and provided with at least a slot to receive said downwardly projecting pin, a double valve plug provided with third and fourth seating surfaces both facing in a direction opposite the first direction adapted to seat on said first and second seating surfaces on said seating member to close said central passageway, a valve stem attached to said valve plug provided with an externally threaded intermediate portion engaging with the threads of said projecting member for raising and lowering said valve plug from and to seating relationship with said seating member, said valve stem extending into said piston cylinder and projecting into the upper end thereof, a helical coil spring in said piston cylinder surrounding said valve stem normally urging said piston toward the lower end of said cylinder, a sleeve member projecting downwardly into said piston cylinder from the upper end thereof, a tubular valve actuating assembly rotatably arranged in said sleeve member slidably attached to an upper end of said valve stem and projecting from said cylinder, said valve actuating assembly and said valve stem being slidably attached by a key on said valve stem arranged in a keyway in said valve actuating assembly, and a hand wheel attached to said actuating assembly exterior to said piston cylinder for rotating said valve stem and lifting and lowering said valve plug from and to said seating member independent of movement of said piston.

4. A steam valve which comprises, in combination, a valve housing having an inlet and an outlet and provided with a central passageway communicating the inlet with the outlet, a seating member in said central passageway provided with a first and a second seating surface both facing in a first direction, a piston cylinder attached to said housing provided with first and second inlets at an upper and a lower end of said cylinder and having at least a downwardly projecting pin, a piston arranged in said piston cylinder having an internally threaded member projecting from said piston cylinder in sliding relationship thereto and provided with at least a slot to receive said downwardly projecting pin, a double valve plug provided with third and fourth seating surfaces both facing in a direction opposite the first direction adapted to seat on said first and second seating surfaces on said seating member to close said central passageway, a valve stem attached to said valve plug provided with an externally threaded intermediate portion engaging with the threads of said projecting member for raising and lowering said valve plug from and to seating relationship with said seating member, said valve stem extending into said piston cylinder and projecting into the upper end thereof, a helical coil spring in said piston cylinder surrounding said valve stem normally urging said piston toward the lower end of said cylinder, a sleeve member projecting downwardly into said piston cylinder from the upper end thereof, a tubular valve actuating assembly provided with a slip joint and having an outwardly extending shoulder rotatably arranged in said sleeve member slidably attached by said slip joint to an upper end of said valve stem and projecting from said cylinder, said slip joint comprising a keyway in said valve actuating assembly and a key on said valve stem arranged in said keyway, and a hand wheel attached to said actuating assembly exterior to said piston cylinder for rotating said valve stem and lifting or lowering said valve plug from and to said seating member independent of movement of said piston.

References Cited in the file of this patent

UNITED STATES PATENTS

| | | |
|---|---|---|
| 620,287 | Donnelly | Feb. 28, 1899 |
| 659,207 | Cash | Oct. 9, 1900 |
| 945,433 | Allen | Jan. 4, 1910 |
| 2,053,611 | Hill | Sept. 8, 1936 |
| 2,622,617 | Sederquist | Dec. 22, 1952 |

FOREIGN PATENTS

| | | |
|---|---|---|
| 19,084 | Great Britain | Aug. 26, 1914 |